(12) United States Patent
Jorgensen

(10) Patent No.: US 8,570,305 B2
(45) Date of Patent: Oct. 29, 2013

(54) SMOOTHING OF TOUCH INPUT

(75) Inventor: Eric Jorgensen, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 12/498,864

(22) Filed: Jul. 7, 2009

(65) Prior Publication Data

US 2011/0007034 A1    Jan. 13, 2011

(51) Int. Cl.
*G06F 3/041* (2006.01)

(52) U.S. Cl.
USPC .......................................... 345/178; 345/179

(58) Field of Classification Search
USPC ........................................................ 345/178
See application file for complete search history.

(56) References Cited

U.S. PATENT DOCUMENTS

| | | | |
|---|---|---|---|
| 6,809,726 B2 | 10/2004 | Kavanagh | |
| 6,998,545 B2 | 2/2006 | Harkcom et al. | |
| 2003/0132922 A1 | 7/2003 | Philipp | |
| 2006/0221061 A1 | 10/2006 | Fry | |
| 2007/0081726 A1 | 4/2007 | Westerman et al. | |
| 2007/0116333 A1 * | 5/2007 | Dempski et al. | 382/128 |
| 2008/0165132 A1 | 7/2008 | Weiss et al. | |
| 2008/0309630 A1 | 12/2008 | Westerman | |
| 2009/0058818 A1 | 3/2009 | Chang et al. | |

OTHER PUBLICATIONS

Gaston, et al., "Tactile Recognition and Localization Using Object Models: The Case of Polyhedra on a Plane", retrieved at <<http://citeseerx.ist.psu.edu/viewdoc/download?doi=10.1.1.18.8552&rep=rep1&type=pdf>>, Mar. 1983, Massachusetts Institute of Technology, Mar. 1983, pp. 22.

* cited by examiner

*Primary Examiner* — Amare Mengistu
*Assistant Examiner* — Shawna Stepp Jones
(74) *Attorney, Agent, or Firm* — Alleman Hall McCoy Russell & Tuttle LLP

(57) ABSTRACT

Smoothing of touch input is provided. One example method of smoothing touch input may include calculating an expected window of touch event positions for a current raw touch event position using previous raw touch event positions, and determining if the current raw touch event position is within the expected window of touch event positions. The method may further include, if the current raw touch event position is within the expected window of touch event positions, returning a distance-agnostic smoothed position. The method may also include, if the current raw touch event position is outside the expected window of touch event positions for longer than a tolerated duration, returning a distance-influenced smoothed position.

20 Claims, 4 Drawing Sheets

SMOOTHING OF TOUCH INPUT

BACKGROUND

Computing systems with touch-sensitive displays may detect input touches from a user's finger, a stylus, an object, and the like. Examples of such input touch gestures may include a tap, a hold-and-release gesture, a drag-and-drop gesture, etc. In some cases, the touch display may be configured to display a user interface with which the user may interact via such input touches. As an example, a user may perform a drag-and-drop touch gesture to reposition an image displayed on the touch display. Some computing systems may be further configured to track multiple touches, allowing programs to make use of complicated multi-touch gestures such as resizing, rotating, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Smoothing of touch input is provided. One example method of smoothing touch input may include calculating an expected window of touch event positions for a current raw touch event position using previous raw touch event positions, and determining if the current raw touch event position is within the expected window of touch event positions. The method may further include returning a distance-agnostic smoothed position if the current raw touch event position is within the expected window of touch event positions. The method may also include returning a distance-influenced smoothed position if the current raw touch event position is outside the expected window of touch event positions for longer than a tolerated duration.

DETAILED DESCRIPTION

Computing systems with touch-sensitive displays may detect input touches from a user's finger, a stylus, an object, and the like, and oftentimes such input touches may be used to control a user interface displayed on the touch display. As an example, in the context of a photography editor application, a user may perform a drag-and-drop touch gesture on the touch display to reposition a photograph displayed on the touch display.

In some cases, such touch inputs directed at a touch display may be "noisy" due to common jitters of the user's hand, finger, etc. while performing the input touch. In the case of the example described above, such noise in the input touch may, for example, cause the photograph to appear as though it is "jumping" around the touch display.

Further, unintentional touch inputs may occur if a user accidentally touches the touch display with another finger, hand, etc. Again, in the case of the previously described example, this may cause the photograph to move on the display in a manner unexpected by the user. Such noisy and/or unintentional touches may not only yield an unpleasant user experience, but may cause users to have difficulty accurately placing and adjusting objects in the user interface. Additionally, computing systems that are configured to detect two touches may register an instantaneous "jump" in one of the touches if a third touch is detected.

Accordingly, the present disclosure relates to an approach of smoothing such touch inputs to yield a more effective user experience, as described in more detail below. It should be appreciated that the herein-described examples are nonlimiting and are provided to aid in illustrating touch input smoothing.

Figure 1:
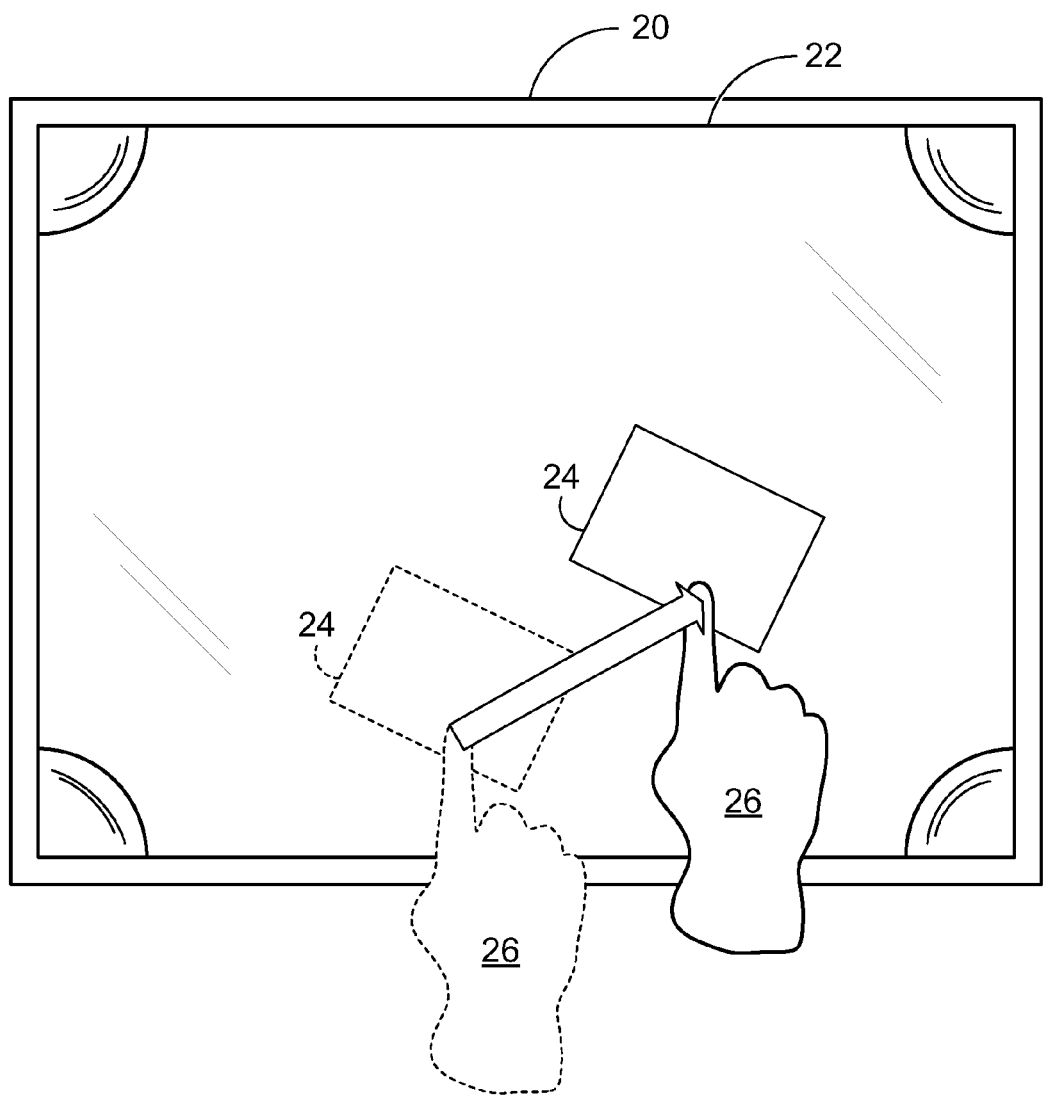
FIG. 1 shows a computing system in accordance with an embodiment of the present disclosure.

FIG. 1 shows an example embodiment of a computing system 20 including a touch display 22. Computing system 20 may include a touch display 22, which may display a virtual object 24, for example, as part of a user interface. A user, such as user 26, may interact with the user interface via touch inputs. One such interaction is depicted in FIG. 1, wherein user 26 repositions virtual object 24 via a drag-and-drop gesture, from an original position as indicated in dashed-line to a final position as indicated in solid-line. Touch display 22 may be configured to detect the touch of user 26 in any suitable manner, such as using capacitive detection, infrared detection, resistive detection, optical detection, etc.

Figure 2:
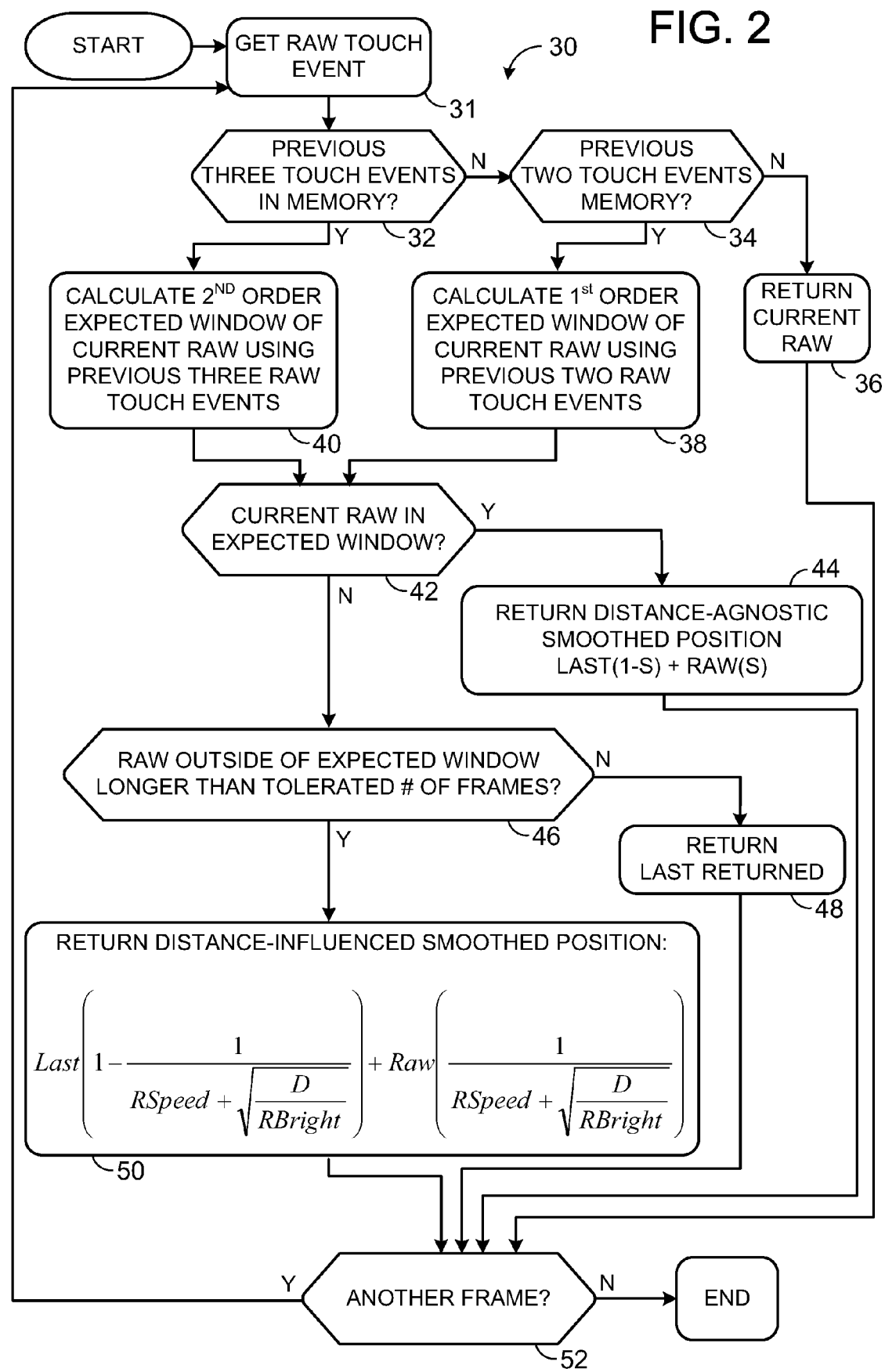
FIG. 2 shows an example method of smoothing touch input in accordance with an embodiment of the present disclosure.

As described above, such touch inputs may be noisy and/or contain unintentional touches. Accordingly, FIG. 2 shows a method 30 of smoothing touch input. As described in more detail hereafter, method 30 includes an approach for smoothing raw touch event position data in real-time, such that a large history of data need not be stored and/or accessed in memory, thus providing a solution with low computational overhead.

At 31, method 30 includes detecting a position of a touch input on a touch display, to be referred to herein as a current raw touch event position. In some embodiments, one current raw touch event position may be detected per frame, such that method 30 may iterate with each frame.

At 32, method 30 includes determining if there are three touch events in memory. A finite number of past touch events may be buffered in memory. For example, the most current touch event and the previous two touch events before the most current touch event. However, in some scenarios, there may not be three touch events in memory (e.g., system freshly powered up, device reset, memory clear, a new touch is initiated, etc.). Method 30 may have to be on at least its third iteration before this condition is satisfied.

If it is determined that there are not three touch events in memory, then at 34 method 30 includes determining if there are two touch events in memory. For example, similar to as described above, method 30 may have to iterate twice before this condition is satisfied.

If it is determined that there are not two touch events in memory, for example data collection may have just commenced, then at 36 method 30 includes returning the current raw touch event position. In other words, when there is no history upon which touch smoothing can be assessed, unsmoothed touch data may be used. Upon returning the current raw touch event position, at 52 method 30 may include determining whether to advance to a next frame. If at 52 method 30 does advance to a next frame, then at 31, a new raw touch event position may be detected (i.e., a current raw touch event position) and method 30 advances to 32.

If it is determined at 34 that there are two touch events stored in memory, then at 38 method 30 includes calculating a first order expected window of current raw touch event positions using the previous two raw touch events. The first order expected window may define a range of positions based on the previous two raw touch events within which the current raw touch event position may be expected to lie.

In some embodiments, the first order expected window may be calculated as follows. A touch event on a touch display may utilize one or more coordinates to define its location, for example a two-dimensional touch display may denote touches with a first coordinate defining a position in a first dimension and a second coordinate defining a position in a second dimension, (e.g., in Cartesian representation, an x-coordinate and a y-coordinate). However, for simplicity of explanation, the following description is provided in the context of one dimension. It can be appreciated that a same approach may be applied independently or cooperatively to each dimension defining the touch event.

As such, taking a current time to be t, the current raw touch event position detected at time t may then be represented as $x_t$. As such, a most recent raw touch event position detected in the previous frame, namely the frame corresponding to time $t-\Delta t$, wherein $\Delta t$ is the time between frames (i.e., frame time), may be represented as $x_{(t-\Delta t)}$. Similarly, a second most recent raw touch event position detected in the next previous frame at time $t-2\Delta t$ may be represented as $x_{(t-2\Delta t)}$.

Accordingly, a raw velocity $v_{(t-\Delta t)}$ (i.e., a first order derivative of position) based on the previous two raw touch events may be calculated as follows, $$V_{(t-\Delta t)} = \frac{x_{(t-\Delta t)} - x_{(t-2\Delta t)}}{\Delta t}.$$

Taking all frames to be of equal duration, i.e., $\Delta t=1$ frame time, the raw velocity may be simplified as follows, $$v_{(t-\Delta t)} = x_{(t-\Delta t)} - x_{(t-2\Delta t)}.$$

As such, a first order prediction of an expected position of the current raw touch event position, namely $x_t^{p1}$, may be calculated using the most recent raw touch event position and the above-described raw velocity, $$x_t^{p1} = x_{(t-\Delta t)} + v_{(t-\Delta t)}.$$

Substituting the raw velocity in terms of the two previous raw touch events yields, $$x_t^{p1} = 2x_{(t-\Delta t)} - x_{(t-2\Delta t)}.$$

A safe radius, $S_R$, may be defined such that when added to or subtracted from the expected position, a first order expected window of touch event positions $W^{p1}$ may be defined, namely, $$W^{p1} = x_t^{p1} \pm SR.$$

Taking the safe radius to be a function linearly dependent on the raw velocity, the safe radius may be represented as, $$SR = \pm R(v_{(t-\Delta t)}),$$

wherein R is a constant value. As an example, in some embodiments, R=5.

Accordingly, the first order expected window of touch event positions may then be written as follows, $$W^{p1} = x_t^{p1} \pm R(v_{(t-\Delta t)}).$$

Upon substituting the expected position and the raw velocity in terms of the two previous raw touch events, the first order expected window of touch event positions may be represented as follows, $$W^{p1} = 2x_{(t-\Delta t)} - x_{(t-2\Delta t)} \pm R(x_{(t-\Delta t)} - x_{(t-2\Delta t)}),$$

where, $x_{(t-\Delta t)}$ is a most recent raw touch event position, $x_{(t-2\Delta t)}$ is a second most recent raw touch event position, and R is a constant.

Such a window as calculated at 38 may then be used at 42 of method 30 when determining if the current raw touch event falls within the expected window, as described in more detail hereafter.

Alternatively, if it is determined at 32 that three touch events are stored in memory, method 30 includes calculating a second order expected window of touch event positions. Whereas a first order expected window of touch event positions is based on a first order calculation of velocity, the second order expected window of touch event positions may be based on a second order calculation of acceleration, described in more detail as follows.

Following the same notation as introduced above, a raw acceleration (i.e., a second derivative of position) may be calculated as follows, $$a_{(t-\Delta t)} = \frac{v_{(t-\Delta t)} - v_{(t-2\Delta t)}}{\Delta t},$$

wherein a same convention as adopted above (i.e., $\Delta t=1$ frame time) may be utilized to simplify the raw acceleration as follows, $$a_{(t-\Delta t)} = v_{(t-\Delta t)} - v_{(t-2\Delta t)}.$$

Here, $v_{(t-\Delta t)}$ is the most recent raw velocity and $v_{(t-2\Delta t)}$ is a second most recent raw velocity, namely, $$v_{(t-\Delta t)} = x_{(t-\Delta t)} - x_{(t-2\Delta t)}$$

$$v_{(t-2\Delta t)} = x_{(t-2\Delta t)} - x_{(t-3\Delta t)}.$$

As described above, $x_{(t-\Delta t)}$ is a most recent raw touch event position, $x_{(t-2\Delta t)}$ is a second most recent raw touch event position. Likewise, $x_{(t-3\Delta t)}$ is a third most recent raw touch event position.

Accordingly, the raw acceleration may be rewritten as follows, $$a_{(t-\Delta t)} = x_{(t-\Delta t)} - 2x_{(t-2\Delta t)} + x_{(t-3\Delta t)}.$$

As such, a second order prediction of an expected position of the current raw touch event position, namely $x_t^{p2}$, may be calculated using the most recent raw touch event position, the most recent raw velocity, and the raw acceleration, $$x_t^{p2} = x_{(t-\Delta t)} + v_{(t-\Delta t)} + \frac{1}{2} a_{(t-\Delta t)}.$$

Substituting the raw velocity and the raw acceleration in terms of the three previous raw touch events yields, $$x_t^{p2} = \frac{5}{2}x_{(t-\Delta t)} - 2x_{(t-2\Delta t)} + \frac{1}{2}x_{(t-3\Delta t)}.$$

Utilizing a safe radius linearly dependent on the raw velocity as introduced above, a second order expected window of touch event positions defined as $W^{p2} = x_t^{p2} \pm SR$ may be rewritten as follows, $$W^{p2} = x_t^{p2} \pm R(v_{(t-\Delta t)}).$$

Upon substituting the expected position and the raw velocity in terms of the three previous raw touch events, the second order expected window of touch event positions may be represented as follows, $$W^{p2} = \frac{5}{2}x_{(t-\Delta t)} - 2x_{(t-2\Delta t)} + \frac{1}{2}x_{(t-3\Delta t)} \pm R(x_{(t-\Delta t)} - x_{(t-2\Delta t)})$$

where $x_{(t-\Delta t)}$ is a most recent raw touch event position, $x_{(t-2\Delta t)}$ is a second most recent raw touch event position, $x_{(t-3\Delta t)}$ is a third most recent raw touch event position, and R is a constant.

Such a window may then be used at 42 of method 30 when determining if the current raw touch event falls within the expected window of values, as described in more detail hereafter.

At 42, method 30 includes determining if the current raw touch event position is within the expected window of touch event positions. As described above, such a window may be a first order expected window of touch event positions calculated at 38 using a previous two touch event positions, or a second order expected window of touch event positions calculated at 40 using a previous three touch event positions.

As described above, the expected window of touch event positions defines a range of values wherein the current raw touch event is predicted to lie. As further described above, the prediction may be based on kinematics, such that the prediction is based on a likely next point given the past raw positions, the raw velocity, and/or raw acceleration thus far. In other words, determining the current raw touch event position to be within the expected window of touch event positions may suggest the current raw touch event position is intentional, in that the detected raw touch event position is at a reasonable location given the user's motion thus far. Alternatively, determining the current raw touch event position to be outside of the expected window of touch event positions may suggest the current raw touch event position is either an unintentional input, or an intentional input that is just far away from where the user has been interacting with the touch-display recently. Such raw touch inputs may be referred to herein as "jumps."

In the case of the former, namely if it is determined at 42 that the current raw touch event position is within the expected window of touch event positions, at 44 method 30 includes returning a distance-agnostic smoothed position. The distance-agnostic smoothed position may be based on the current raw touch event position and a last-returned position. The last-returned position is the value returned by method 30 in a previous frame. As examples, the last-returned position may be the value returned at 36, 44, 48 or 50 of the previous frame. In some embodiments, the distance-agnostic smoothed position may be a weighted average of the current raw touch event position and the last-returned position, such as follows, Last$(1-S)$+Raw$(S)$, where Last is the last-returned position, Raw is the current raw touch event position, and S is a constant. In some embodiments, S may be a value between 0 and 1. As an example, in some embodiments, S=0.3. S can be given a relatively large value to favor the raw touch event positions, or S can be given a relatively small value to favor the last reported touch event positions, thus effectively slowing response in favor of smoothing jumps.

The term "distance-agnostic" is used to describe this calculation because the calculation is not influenced by the distance between the current raw touch event position and the last-returned position.

Alternatively, if it is determined at 42 that the current raw touch event position is outside of the expected window of touch event positions, at 46 method 30 includes determining if the current raw touch event position is outside of the expected window of touch event positions longer than a tolerated duration (e.g., a tolerated number of frames). For example, such a determination may include determining if a set of most recent raw touch event positions have remained outside the expected window of touch event positions for longer than a tolerated duration. As an example, in one embodiment, the tolerated duration may be five frames, such that the determination includes determining that the raw touch event position corresponding to each of the last five frames was outside of the expected window calculated for that frame.

If it is determined that the current raw touch event position is outside the expected window of touch event positions for less than the tolerated duration, (e.g., if the set of most recent raw touch event positions have not remained outside the expected window of touch event positions for longer than a tolerated duration) then at 48 method 30 includes returning the last-returned position. As described above, the last-returned position is the value returned by method 30 in a previous frame. As examples, the last-returned position may be the value returned at 36, 44, 48 or 50 of the last frame. This test may effectively allow the method to ignore noise and/or unintended jumps.

Alternatively, if it is determined that the current raw touch event position is outside the expected window of touch event positions for longer than the tolerated duration, (e.g., if the set of most recent raw touch event positions have remained outside the expected window of touch event positions for longer than a tolerated duration) then at 50 method 30 includes returning a distance-influenced smoothed position.

The distance-influenced smoothed position may be based on a distance between the current raw touch event position and a last-returned position. Further, in some embodiments, the distance-influenced smoothed position has a component based on the current raw touch event position and a component based on a last-returned position. For example, in some embodiments, the distance-influenced smoothed position may be based on the current raw touch event position, a last-returned position, and a distance between the current raw touch event position and the last-returned position.

Thus, whereas the distance-agnostic smoothed position returned at 44 of method 30 is independent of the distance between the current raw touch event position and the last-returned position, the distance-influenced smoothed position is dependent on such a distance.

The distance-influenced smoothed position may be represented as follows, $$\text{Last}\left(1 - \cfrac{1}{\text{RSpeed} + \sqrt{\cfrac{D}{\text{RBright}}}}\right) + \text{Raw}\left(\cfrac{1}{\text{RSpeed} + \sqrt{\cfrac{D}{\text{RBright}}}}\right),$$

where Last is the last-returned position, Raw is the current raw touch event position, and D is the distance between the current raw touch event position and the last-returned position. Further, RSpeed may be a constant, and RBright may be a constant, each of which may be tuned to provide a desired smoothing behavior.

Thus, just as in the case of the distance-agnostic smoothed position, the distance-influenced smoothed position may be represented as a weighted average of the current raw touch event position and the last-returned position. However, the constant parameter S of the distance-agnostic smoothed position has been replaced by an "effective S," namely $$\cfrac{1}{\text{RSpeed} + \sqrt{D/\text{RBright}}},$$

which is inversely dependent on the distance, D, between the current raw touch event position and the last-returned position. Thus, as D decreases (i.e., the last-returned position is closer to the current raw touch) the effective S increases. In other words, the weighted average places a larger weight on the current raw touch event position, and accordingly, a smaller weight on the last-returned position.

Further, as described above, the effective S is also dependent on two additional parameters, namely RSpeed and RBright. The parameter RSpeed may be represented by a constant value, wherein the magnitude may be inversely proportional to how "fast" the last-returned position catches up to the current raw touch. In other words, a small value for RSpeed yields a larger effective S, and thus a larger weight is placed on the current raw touch event position. Accordingly, RSpeed may represent a floor value for the rate of catch-up, in that regardless of the value of RBright, the catch-up rate may not be faster than the value indicated by RSpeed.

The parameter RBright may be represented by a constant value, wherein the magnitude may be proportional to how "fast" the last-returned position is catching up to the current raw touch. In other words, a large value for RBright yields a larger effective S, and thus a larger weight is placed on the current raw touch event position, and accordingly, a smaller weight on the last-returned position. Accordingly, RBright may mediate the responsiveness of the equation to the distance D. For example, a small value of RBright yields an equation that is highly sensitive to the distance.

Figure 4:
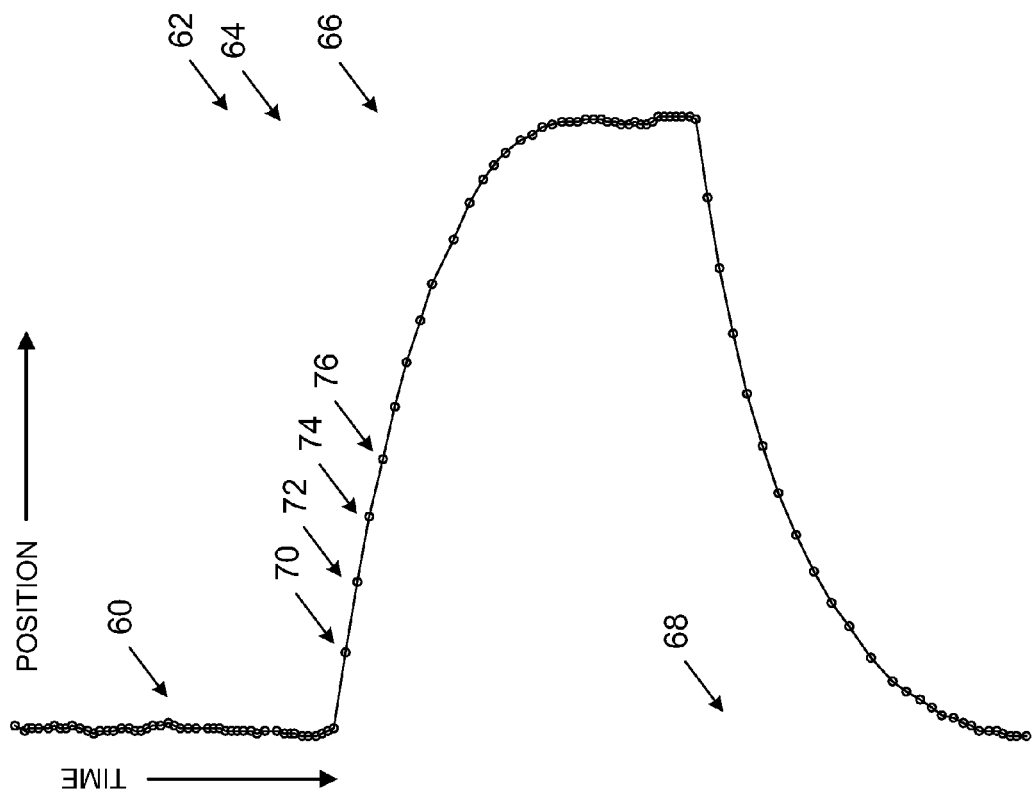
FIG. 4 shows an example of smoothed touch input data resulting from smoothing the touch input data of FIG. 3, the smoothed touch input data including a plurality of distance-influenced smoothed positions and distance-agnostic smoothed-positions.
Figure 3:
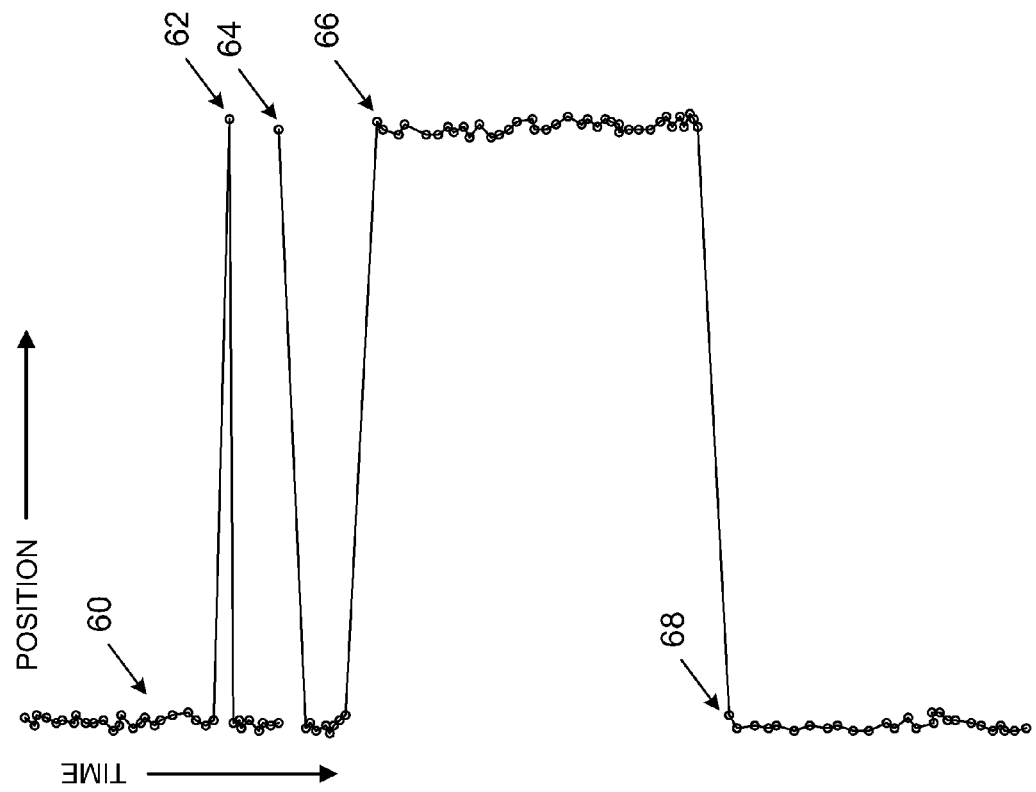
FIG. 3 shows an example of touch input data including a plurality of raw touch event positions.

FIGS. 3 and 4 show examples of raw touch inputs, and smoothed touch inputs, respectively. With regard to FIG. 3, raw touch input data comprising a plurality of raw touch event positions is shown as a function of time. As described above, raw touch input data may be noisy as a result of, for example, natural jitters of a user's finger. Such behavior is shown, for example, at 60. As further described above, raw touch input data may also include jumps, such as unintentional jumps due to a user inadvertently touching the touch display with a hand, finger, elbow, etc. or jumps due to limitations in the hardware detecting multiple touches. Such behavior is shown at 62 and 64, wherein raw touch event positions are detected that are outlying with respect to the data detected thus far. Further, in some cases jumps may be intentional, such as shown at 66, where, for example, a computing system configured to detect two simultaneous touches shifts its focus to a deliberate third touch. At 68, another jump is detected, namely a jump back to an original position. For example, the third touch may be lifted and the computing system returns to reporting the original second touch.

The user inputs described above may be associated with, for example, interaction with and/or controlling of elements of a user interface displayed on the touch display. As an example, such inputs may be used to reposition and/or resize an image displayed on the display. If the touch display responds to each detected raw touch event position, the user might see the image, for example, quivering in response to the noisy input received at 60, and jumping across the screen in response to the input received at 62, 64, 66 and 68.

Alternatively, FIG. 4 shows the smoothed data, wherein each raw touch event position of FIG. 3 is smoothed via an embodiment of method 30. As such, at 60 the data of FIG. 4 appears smoothed in comparison to that of FIG. 3. Continuing with FIG. 4, the jumps at 62 and 64 are detected as being unintentional, and a last-returned position is utilized instead of the raw touch event position at each of 62 and 64. For example, the raw touch event positions detected at 62 and 64 may have each been outside of the expected window calculated for each point, but may not have been outside the window longer than the tolerated duration. Accordingly, a last-returned value may instead be used.

Continuing with FIG. 4, the jump at 66 is detected as being intentional, in that although the raw event position is outside of the expected window calculated for that point, it remains outside of the window for a tolerated duration. Accordingly, upon recognizing that this jump may be intentional, the smoothing algorithm begins smoothly adjusting the raw event positions so as to return smoothed positions for repositioning a user interface element in more gentle and less sudden manner, as shown at 70, 72, 74 and 76.

Likewise, another intentional jump may be detected at 68, where, for example, the user returns to an original location on the user interface. For example, since that raw event position is outside of the expected window calculated for that point, and remains outside of the window for a tolerated duration, the jump may be intentional. Accordingly, the smoothing algorithm begins smoothly adjusting the raw event positions so as to return smoothed positions for displaying a more gentle, and less sudden, jump of the user interface element.

Figure 5:
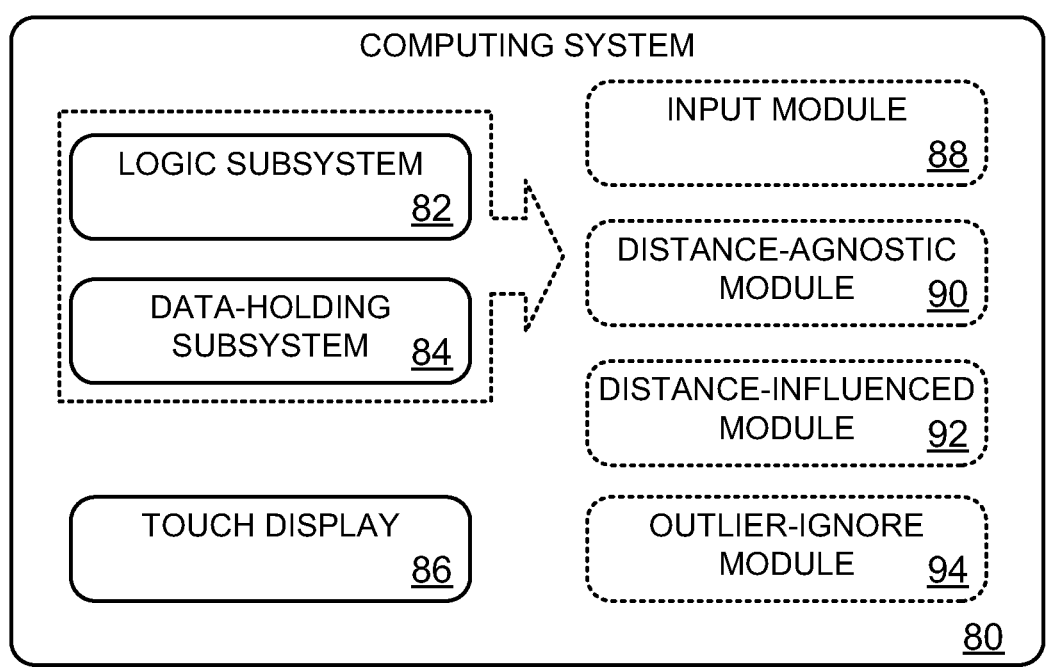
FIG. 5 schematically shows an example computing system in accordance with an embodiment of the present disclosure.

In some embodiments, the above described methods and processes may be tied to a computing system. As an example, FIG. 5 schematically shows a computing system 80 that may perform one or more of the above described methods and processes. Computing system 80 includes a logic subsystem 82 and a data-holding subsystem 84. Computing system 80 may optionally include a display subsystem and/or other components not shown in FIG. 5.

Logic subsystem 82 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 84 may include one or more physical devices configured to hold data and/or instructions executable by the logic subsystem to implement the herein described methods and processes. When such methods and processes are implemented, the state of data-holding subsystem 84 may be transformed (e.g., to hold different data). Data-holding subsystem 84 may include removable media and/or built-in devices. Data-holding subsystem 84 may include optical memory devices, semiconductor memory devices, and/or magnetic memory devices, among others. Data-holding subsystem 84 may include devices with one or more of the following characteristics: volatile, nonvolatile, dynamic, static, read/write, read-only, random access, sequential access, location addressable, file addressable, and content addressable. In some embodiments, logic subsystem 82 and data-holding subsystem 84 may be integrated into one or more common devices, such as an application specific integrated circuit or a system on a chip.

The terms "module" and "engine" may be used to describe an aspect of computing system 80 that is implemented to perform one or more particular functions. In some cases, such a module or engine may be instantiated via logic subsystem 82 executing instructions held by data-holding subsystem 84. It is to be understood that different modules and/or engines may be instantiated from the same application, code block, object, routine, and/or function. Likewise, the same module and/or engine may be instantiated by different applications, code blocks, objects, routines, and/or functions in some cases.

Computing system 80 may include an input module 88 to recognize a touch event position of a touch input directed to the touch display. Further, computing system 80 may include a distance-agnostic module 90 to return a distance-agnostic smoothed position if a current raw touch event position is within an expected window of touch event positions. Computing system 80 may also include a distance-influenced module 92 to return a distance-influenced smoothed position if the current raw touch event position is outside the expected window of touch event positions for longer than a tolerated duration, where the distance-influenced smoothed position is based on a distance between the current raw touch event position and a last-returned position.

In some embodiments, computing system 80 may further include an outlier-ignore module 94 to return the last-returned position if the current raw touch event position is outside the expected window of touch event positions for less than a the tolerated duration.

When included, a display subsystem may be used to present a visual representation of data held by data-holding subsystem 84, for example, on touch display 86. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with logic subsystem 82 and/or data-holding subsystem 84 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of smoothing touch input, the method comprising:
calculating an expected window of touch event positions for a current raw touch event position using previous raw touch event positions;
determining if the current raw touch event position is within the expected window of touch event positions; and
if the current raw touch event position is within the expected window of touch event positions, returning a distance-agnostic smoothed position; or
if the current raw touch event position is outside the expected window of touch event positions for longer than a tolerated duration, return a distance-influenced smoothed position calculated as a function of the current raw touch event position.

2. The method of claim 1, where calculating the expected window of touch event positions includes calculating a first order expected window of touch event positions using a previous two touch event positions.

3. The method of claim 2, where the first order expected window of touch event positions is $2x_{(t-\Delta t)} - x_{(t-2\Delta t)} \pm R(x_{(t-\Delta t)} - x_{(t-2\Delta t)})$, where $x_{(t-\Delta t)}$ is a most recent raw touch event position, $x_{(t-2\Delta t)}$ is a second most recent raw touch event position, and R is a constant.

4. The method of claim 1, where calculating the expected window of touch event positions includes calculating a second order expected window of touch event positions using a previous three touch event positions.

5. The method of claim 4, where the second order expected window of touch event positions is $$\frac{5}{2}x_{(t-\Delta t)} - 2x_{(t-2\Delta t)} + \frac{1}{2}x_{(t-3\Delta t)} \pm R(x_{(t-\Delta t)} - x_{(t-2\Delta t)}),$$

where $x_{(t-\Delta t)}$ is a most recent touch event position, $x_{(t-2\Delta t)}$ is a second most recent touch event position, $x_{(t-3\Delta t)}$ is a third most recent touch event position, and R is a constant.

6. The method of claim 1, where the distance-influenced smoothed position is based on a distance between the current raw touch event position and a last-returned position.

7. The method of claim 6, where the distance-influenced smoothed position has a component based on the current raw touch event position and a component based on the last-returned position.

8. The method of claim 7, where the distance-influenced smoothed position is:

$$\text{Last}\left(1 - \frac{1}{RSpeed + \sqrt{\frac{D}{RBright}}}\right) + \text{Raw}\left(\frac{1}{RSpeed + \sqrt{\frac{D}{RBright}}}\right),$$

where Last is the last-returned position, Raw is the current raw touch event position, D is the distance between the current raw touch event position and the last-returned position, RSpeed is a constant, and RBright is a constant.

9. The method of claim 1, where the distance-agnostic smoothed position is based on the current raw touch event position and a last-returned position.

10. The method of claim 9, where the distance-agnostic smoothed position is:

Last$(1-S)$+Raw$(S)$, where Last is the last-returned position, Raw is the current raw touch event position, and S is a constant.

11. The method of claim 1, further comprising returning a last-returned position if the current raw touch event position is outside the expected window of touch event positions for less than the tolerated duration.

12. The method of claim 1, where the tolerated duration is five frames.

13. A method of smoothing touch input, the method comprising:
calculating a second order expected window of touch event positions using a previous three touch event positions;
determining if a current raw touch event position is within the second order expected window of touch event positions; and
if the current raw touch event position is within the second order expected window of touch event positions, returning a distance-agnostic smoothed position that is based on the current raw touch event position and a last-returned position; and
if the current raw touch event position is outside the second order expected window of touch event positions, determining if a set of most recent raw touch event positions have remained outside the second order expected window of touch event positions for longer than a tolerated duration; then
if the set of most recent raw touch event positions have not remained outside the second order expected window of touch event positions for longer than the tolerated duration, returning a last-returned position; or
if the set of most recent raw touch event positions have remained outside the second order expected window of touch event positions for longer than the tolerated duration, returning a distance-influenced smoothed position based on the current raw touch event position, a last-returned position, and a distance between the current raw touch event position and the last-returned position.

14. The method of claim 13, where the second order expected window is $$\frac{5}{2}x_{(t-\Delta t)} - 2x_{(t-2\Delta t)} + \frac{1}{2}x_{(t-3\Delta t)} \pm R(x_{(t-\Delta t)} - x_{(t-2\Delta t)}),$$

where $x_{(t-\Delta t)}$ is a most recent touch event position, $x_{(t-2\Delta t)}$ is a second most recent touch event position, $x_{(t-3\Delta t)}$ is a third most recent touch event position, and R is a constant.

15. The method of claim 13, where the distance-influenced smoothed position is:

$$\text{Last}\left(1 - \frac{1}{Rspeed + \sqrt{\frac{D}{RBright}}}\right) + \text{Raw}\left(\frac{1}{Rspeed + \sqrt{\frac{D}{RBright}}}\right)$$

where Last is the last-returned position, Raw is the current raw touch event position, D is the distance between the current raw touch event position and the last-returned position, RSpeed is a constant, and RBright is a constant.

16. The method of claim 13, where the distance-agnostic smoothed position is:

Last$(1-S)$+Raw$(S)$, where Last is the last-returned position, Raw is the current raw touch event position, and S is a constant.

17. A computing system, comprising:
a touch display;
an input module to recognize a touch event position of a touch input directed to the touch display;
a distance-agnostic module to return a distance-agnostic smoothed position if a current raw touch event position is within an expected window of touch event positions; and
a distance-influenced module to return a distance-influenced smoothed position if the current raw touch event position is outside the expected window of touch event positions for longer than a tolerated duration, the distance-influenced smoothed position being based on a distance between the current raw touch event position and a last-returned position.

18. The computing system of claim 17, further comprising an outlier-ignore module to return the last-returned position if the current raw touch event position is outside the expected window of touch event positions for less than the tolerated duration.

19. The computing system of claim 17, where the distance-agnostic smoothed position is:

Last$(1-S)$+Raw$(S)$, where Last is the last-returned position, Raw is the current raw touch event position, and S is a constant.

20. The computing system of claim 17, where the distance-influenced smoothed position is:

$$\text{Last}\left(1 - \frac{1}{RSpeed + \sqrt{\frac{D}{RBright}}}\right) + \text{Raw}\left(\frac{1}{RSpeed + \sqrt{\frac{D}{RBright}}}\right),$$

where Last is the last-returned position, Raw is the current raw touch event position, D is the distance between the current raw touch event position and the last-returned position, RSpeed is a constant, and RBright is a constant.

* * * * *